D. D. LAMOND.
CHECKER BRICK FOR HOT BLAST STOVES.
APPLICATION FILED JUNE 17, 1909.
951,012.
Patented Mar. 1, 1910.
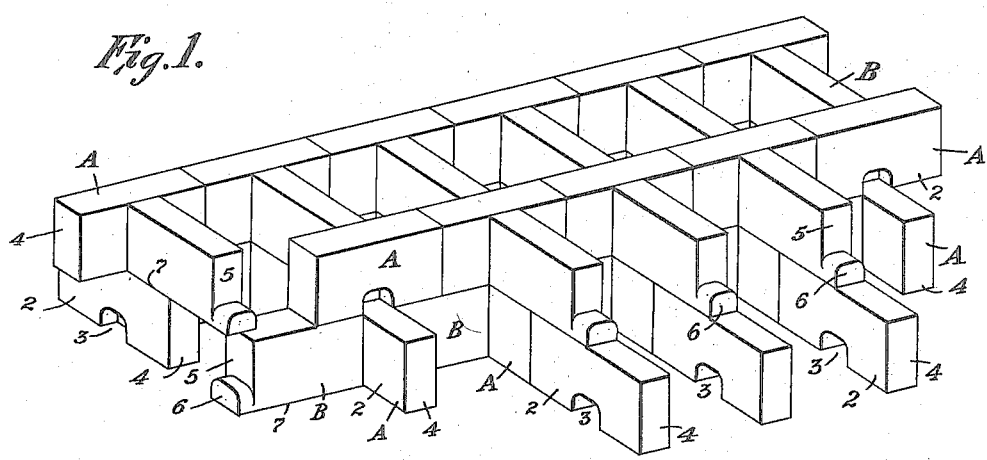
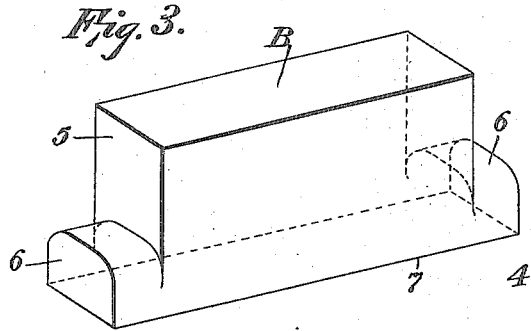
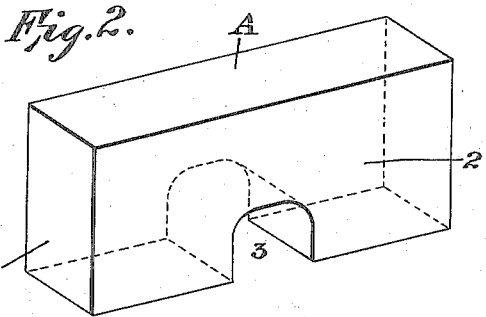
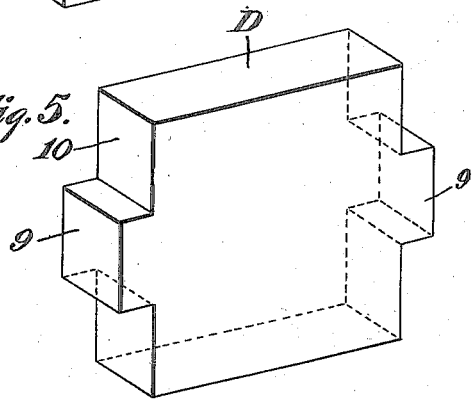
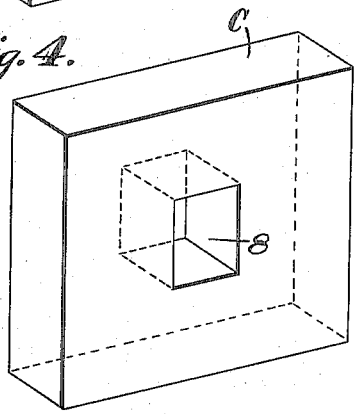
Witnesses:
Inventor
David D. Lamond,
By
Attorney.

UNITED STATES PATENT OFFICE.

DAVID D. LAMOND, OF PITTSBURG, PENNSYLVANIA.

CHECKER-BRICK FOR HOT-BLAST STOVES.

951,012.  Specification of Letters Patent.  Patented Mar. 1, 1910.

Application filed June 17, 1909. Serial No. 502,706.

*To all whom it may concern:*

Be it known that I, DAVID D. LAMOND, a resident of Pittsburg, in the county of Allegheny and State of Pennsylvania, have invented certain new and useful Improvements in Checker-Brick for Hot-Blast Stoves, of which the following is a specification.

This invention relates to bonding and interlocking checker brick in the building of hot-blast stoves for furnaces, the object being to produce brick of such form as to provide an efficient bond, the brick being of such form as to break joint in the successive courses. The integrity of the flue structure is thus maintained notwithstanding the wide and sudden variations in temperature to which the flues of hot-blast stoves are subjected.

The invention is preferably embodied in two shapes of bricks, one shape having a passage formed therethrough, preferably midway its ends, to receive the reduced or projecting extremities of bricks of the other shape, such projecting extremities fully entering the passage of the first mentioned shape so that the sides of each passage-formed brick are squarely engaged by the end surfaces of the other shape.

In the accompanying drawings, Figure 1 is a view in perspective of some of the brick laid up, as when constructing a stove. Figs. 2 and 3 are details of two different shapes employed. Figs. 4 and 5 are details of shapes of modified form.

The invention is preferably embodied in the two shapes A and B, shown in Figs. 2 and 3. Shape A is of rectangular outline, and formed therethrough from one side face 2 to the opposite side face is passageway 3, which is here shown located midway the end surfaces 4, and is open through one of the longitudinal edge faces, in the present illustration the bottom face. Shape B is also of rectangular outline, and on its end faces 5 are the extensions or projections 6 which, in the adaptation shown in Figs. 1 and 3, are coincident with and form continuations of the bottom edge 7 of the brick. The length of each of projections 6 is half the length of passage-way 3, so that with two of shapes B in line with their projections 6 abutting, one of the shapes A fits therebetween, embracing projections 6 with its side faces 2 engaged by the faces 5 of shape B. The corners of the passageway and the end projections are preferably rounded, as shown.

When the brick are laid up to form the flue checker work, as in Fig. 1, it will be seen that in each horizontal course there are parallel rows of shape A, and extending at right angles to these rows are parallel rows of shapes B. It is further characteristic of the invention that the rows of shapes A in one course are at right angles to the like rows of shapes in the courses immediately above and below. A result of this is that in the successive rows each shape A is centered with though at right angles to the like shapes immediately above it and below it. The shapes interlock in such manner that no two seams or joints are in line in adjacent courses and a thoroughly efficient and durable bond results.

In the modification of Figs. 4 and 5, the shapes C and D are of square outline, and shape C is formed with the angular central passageway 8 in which enter projections 9 extending centrally from the end faces 10 of shape D. In fact, shape C is simply shape A doubled, thereby locating the passageway at the center instead of at one of the edges. Likewise shape D merely involves a doubling of shape B.

While the invention is here shown and described in connection with the construction of checker work for hot-blast stoves, it may be employed wherever such construction may be advantageously used.

I claim:—

1. Checker work for stoves, etc., consisting of brick having end extensions, in combination with other brick disposed at right angles thereto and having openings formed therethrough between their ends into which the extremities of the first mentioned bricks are entered.

2. Checker work for stoves, etc., consisting of brick having end extensions, in combination with other brick disposed at right angles thereto and having passages formed therethrough midway their opposite ends into which the extremities of the first mentioned brick are entered.

3. Checker work for stoves, etc., consisting of brick having end extensions, in combination with passage formed brick disposed at right angles thereto and the transverse thickness of which is double the length of the end extensions of the first mentioned bricks, said passages located intermediate the brick ends, whereby two bricks with extended ends may abut against opposite faces of a passage-formed brick with their end extensions entered in the passage thereof.

4. Checker work for stoves, etc., consisting of courses of brick laid one course upon the other, each course formed of bricks having end extensions and of other bricks having passages formed therethrough to receive said end extensions, the bricks of each form laid in parallel rows which extend at right angles to each other in the same course, the rows formed of like bricks being at right angles to each other in the adjacent courses.

5. Checker work for stoves, etc., consisting of courses of bricks laid one course upon another, each course made up of bricks having end extensions and other bricks having passages formed therethrough to receive the extension, the length of each passage-formed brick corresponding to the length of the other brick including the extensions of the latter, the bricks of each form arranged in parallel rows in each course with the rows of each form extending in right angles to each other, the passage-formed bricks of each course disposed centrally of but at right angles to the like bricks of the next adjacent courses.

6. Checker work for stoves, etc., consisting of two shapes of bricks laid in courses with the bricks of like form in parallel rows and at right angles to rows formed of the other shape, the bricks of one shape each having a transverse passage which extends from one side face to the other and open through an edge of the brick, and the other shape having end extensions coincident with one longitudinal edge thereof with the end extensions entered in the passages of the other shape.

7. Checker work for stoves, etc., consisting of bricks of two shapes laid in the same course at right angles to each other, one shape having a passage formed therethrough from one vertical face to the opposite vertical face and open through a horizontal face, and the other shape having end extensions coincident with one longitudinal edge thereof with adjacent bricks of the last mentioned shape adapted to abut against faces of the passage-formed brick with their end extensions entered in the passage thereof.

8. Checker work for stoves, etc., consisting of bricks of two forms arranged at right angles to each other, the bricks of one form having passages extending therethrough from one vertical face to the other, the passage rounded to avoid angular corners, and the other form having end extensions rounded, to enter and fit within said passages.

9. A brick for checker work of rectangular outline and having a passage extending therethrough between its ends from one side face to the other, the passage being open through a longitudinal edge of the brick.

In testimony whereof I affix my signature in presence of two witnesses.

DAVID D. LAMOND.

Witnesses:
ALEX. S. MABON,
J. N. NESBIT.